US005674076A

United States Patent [19]

Billings et al.

[11] Patent Number: 5,674,076

[45] Date of Patent: Oct. 7, 1997

[54] HAND-HELD SOUND GENERATING DEVICE

[75] Inventors: Zeb Billings, Naples, Fla.; Michael Hennig, Teaneck, N.J.; Ralph Dyck; Marc Jorgenson, both of Vancouver, Canada

[73] Assignee: Serenity Productions, Inc., Naples, Fla.

[21] Appl. No.: 388,355

[22] Filed: Feb. 14, 1995

[51] Int. Cl.$^6$ .................................................... G09B 25/00

[52] U.S. Cl. .......................... 434/365; 434/169; 381/159; 446/397

[58] Field of Search .................................... 434/156, 308, 434/365, 169, 317, 318, 319, 185; 446/397, 484; 379/431; 401/195; 381/188, 205, 88, 159; D14/188, 195–198; D19/60; D21/64; 482/82

[56] References Cited

U.S. PATENT DOCUMENTS

| | | | |
|---|---|---|---|
| 3,541,452 | 11/1970 | Disesa et al. | D14/188 X |
| 4,968,255 | 11/1990 | Lee et al. | 434/169 X |
| 5,097,513 | 3/1992 | Jordan et al. | 381/159 X |
| 5,125,866 | 6/1992 | Arad et al. | 446/397 |
| 5,154,614 | 10/1992 | Matsuoka et al. | 434/169 X |
| 5,209,665 | 5/1993 | Billings et al. | 434/317 X |
| 5,368,308 | 11/1994 | Darnell | 434/169 X |

FOREIGN PATENT DOCUMENTS

| | | | |
|---|---|---|---|
| 2 276 069 | 1/1976 | France | 482/82 |
| 6-14092 | 1/1994 | Japan | 379/431 |
| 2 179 265 | 3/1987 | United Kingdom | 482/82 |

*Primary Examiner*—Joe Cheng

*Attorney, Agent, or Firm*—Andrus, Sceales, Starke & Sawall

[57] ABSTRACT

A sound generator consists of a housing defining open first and second ends and an internal passage extending therebetween. A speaker is positioned within the housing, and a control arrangement including a circuit board is interconnected with the speaker. The circuit board is preferably located within the internal cavity, and a manually actuable switching arrangement is accessible from the exterior of the housing and interconnected with the circuit board for controlling the output therefrom to the speaker to control the sound generated by the speaker. In one form, the switches are accessible via a control portion formed on a wall of the housing, and in another form the switches are accessible through a movable shield member or sleeve mounted to the housing having an opening providing access to certain of the switches. Grills are positioned within the open ends of the housing, to enable sound waves to escape from both sides of the speaker, with the internal passage having a length ensuring that the emanating sound waves do not cancel each other.

19 Claims, 7 Drawing Sheets

10
12
14
16
18
20
22
24
26
27
28
29a
29b
29c
30c
38
40
56
66
67
69
70
72a
72b
72c
74
76
78
80
82
84
90
91
94
98
99
101'
102
103
107
108
119
A
B
C
D

FIG. 3
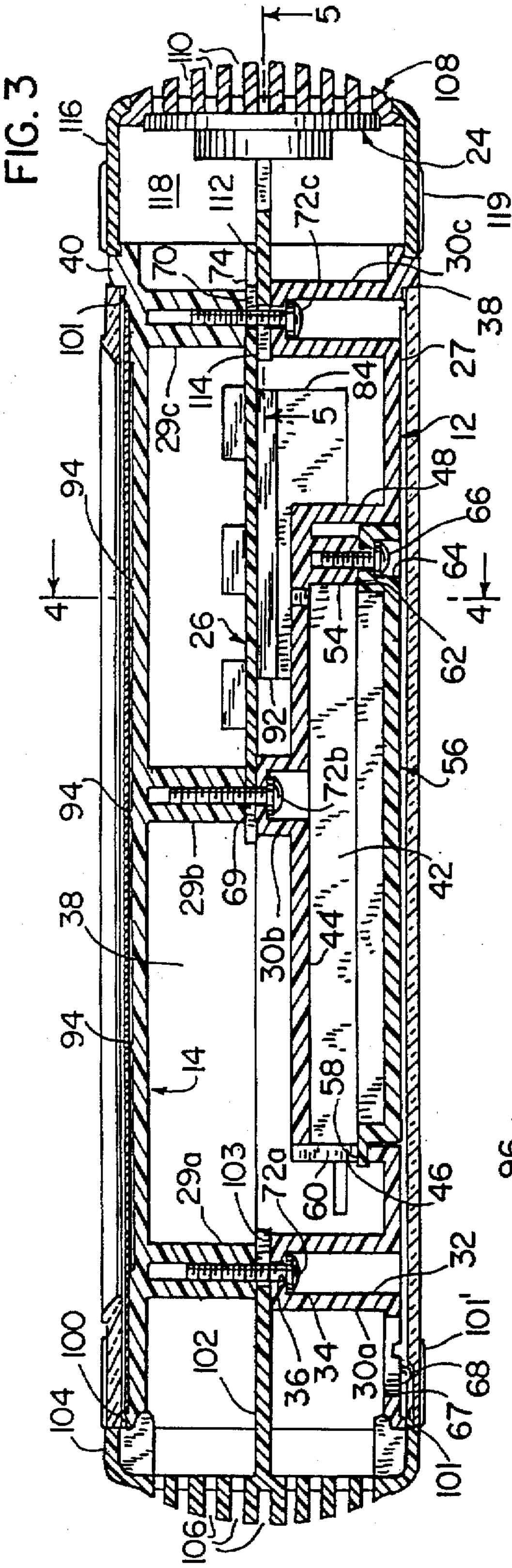
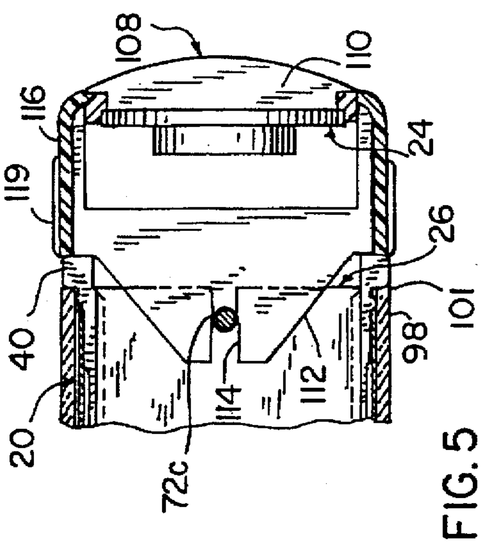
FIG. 5
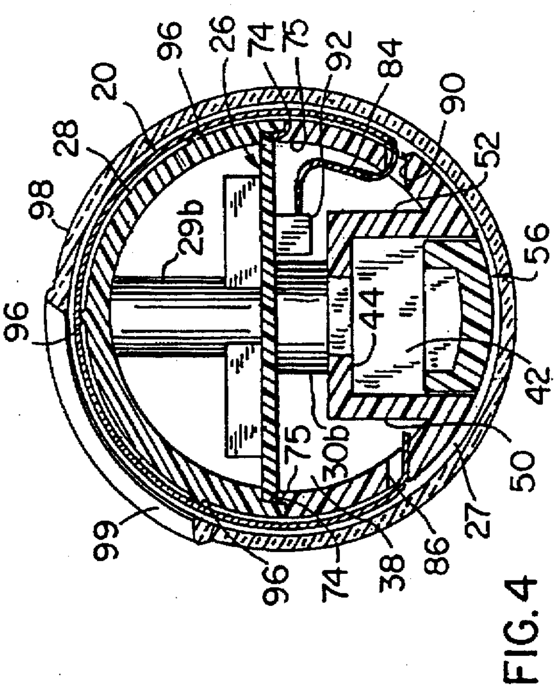
FIG. 4

HAND-HELD SOUND GENERATING DEVICE

BACKGROUND AND SUMMARY OF THE INVENTION

This invention relates to a sound generating device, and more particularly to such a device which is adapted to be hand-held and used to generate different types of sounds in response to a control arrangement.

Sound effects generators are known, and an example of such is disclosed in Billings et al U.S. Pat. No. 5,209,665 issued May 11, 1993. This patent discloses a digital sound effect generator utilized in combination with a book, with a switching mechanism in the form of a keypad in a predetermined location relative to the text portion of the book. Each keypad switch includes a depiction, and the sound generator provides a predetermined sound effect upon actuation of one of the keypad switches in response to encountering the depiction associated with the switch in the text of the book.

It is an object of the present invention to utilize a digital sound generator in a unique, hand-held construction. It is another object of the invention to provide a sound effects generator which is simple in its components and construction, and which provides a unique arrangement for efficiently producing a relatively high volume and quality of sound using a minimum number of components and a simple assembly of such components. A further object of the invention is to provide a sound generator construction capable of being employed in different housing arrangements for efficiently and effectively producing different sounds.

In accordance with one aspect of the invention, a sound generating device includes a body defining opposite first and second acoustically open ends and an internal passage extending therebetween. A speaker is positioned between the first and second ends of the body and a digital sound generator is mounted to the body, preferably being located within the internal passage. A manually operable control arrangement is interconnected with the sound generator and mounted to the body. The control arrangement is manually operable from the exterior of the body to control the sounds generated through the digital sound generator and the speaker. Preferably, the body is in the form of a hollow tubular housing defining an axial internal passage extending between the first and second ends. The ends are preferably open, and a grill member is mounted to each end. Each grill member defines a series of openings which communicate between the internal passage and the exterior of the housing, for enabling sounds generated by the speaker to escape from the housing. The housing preferably defines a substantially circular outer side wall, and the manually operable control arrangement includes a series of switches located adjacent or mounted to the housing side wall. In one form, the switches are defined by a curved mylar keypad disposed over the housing, with the keypad having switch sections arranged in two or more radially offset rows. A shield member is rotatably secured to the housing over the keypad and the housing side wall. The shield member is in the form of a tubular sleeve, and includes an opening which is shaped and sized so as to provide access to one row of the keypad switch sections at a time, dependent upon the rotational position of the shield member relative to the housing. The body outer wall is circular in cross-section, and the shield member has an internal wall which is also circular in cross-section, such that the housing extends through a passage defined by the internal wall of the sleeve. The housing preferably includes a shoulder which engages one end of the sleeve, and an end cap carrying one of the grill members is secured to the housing adjacent the opposite end of the sleeve to capture the sleeve in position on the housing. In another form, the switches may be secured to a control portion of the housing side wall, without the shield member.

The speaker is preferably located toward one end of the housing, such as by being secured to one of the grill members. The speaker generates sound waves emanating in opposite directions. The sound waves generated by the speaker are discharged from the near end of the housing adjacent the speaker through one of the grill members, and also travel through the internal passage defined by the housing so as to be discharged from the far end of the housing through the other grill members. The housing has a length which ensures that the sound waves emanating from both of its ends do not cancel each other.

The sound generator preferably includes a circuit or control board onto which data is stored to enable generation of a variety of distinct, high quality sound effects to be generated by the device. The board is interconnected with the speaker, and is located within the internal passage defined by the housing. The passage extends along a longitudinal axis, and the board is arranged so as to extend substantially parallel to the longitudinal axis of the passage. In a preferred form, the housing is constructed of a pair of sections secured together by fasteners interconnecting facing bosses formed on each section, and two of the fasteners function to secure the circuit board between facing bosses.

The invention further contemplates a method of assembling a sound generating device, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is a longitudinal section view of the sound generator of FIG. 1;

FIG. 4 is a section view taken along line 4—4 of FIG. 3;

FIG. 5 is a partial section view taken along line 5—5 of FIG. 3;

DETAILED DESCRIPTION OF THE INVENTION

Figures 1, 2:
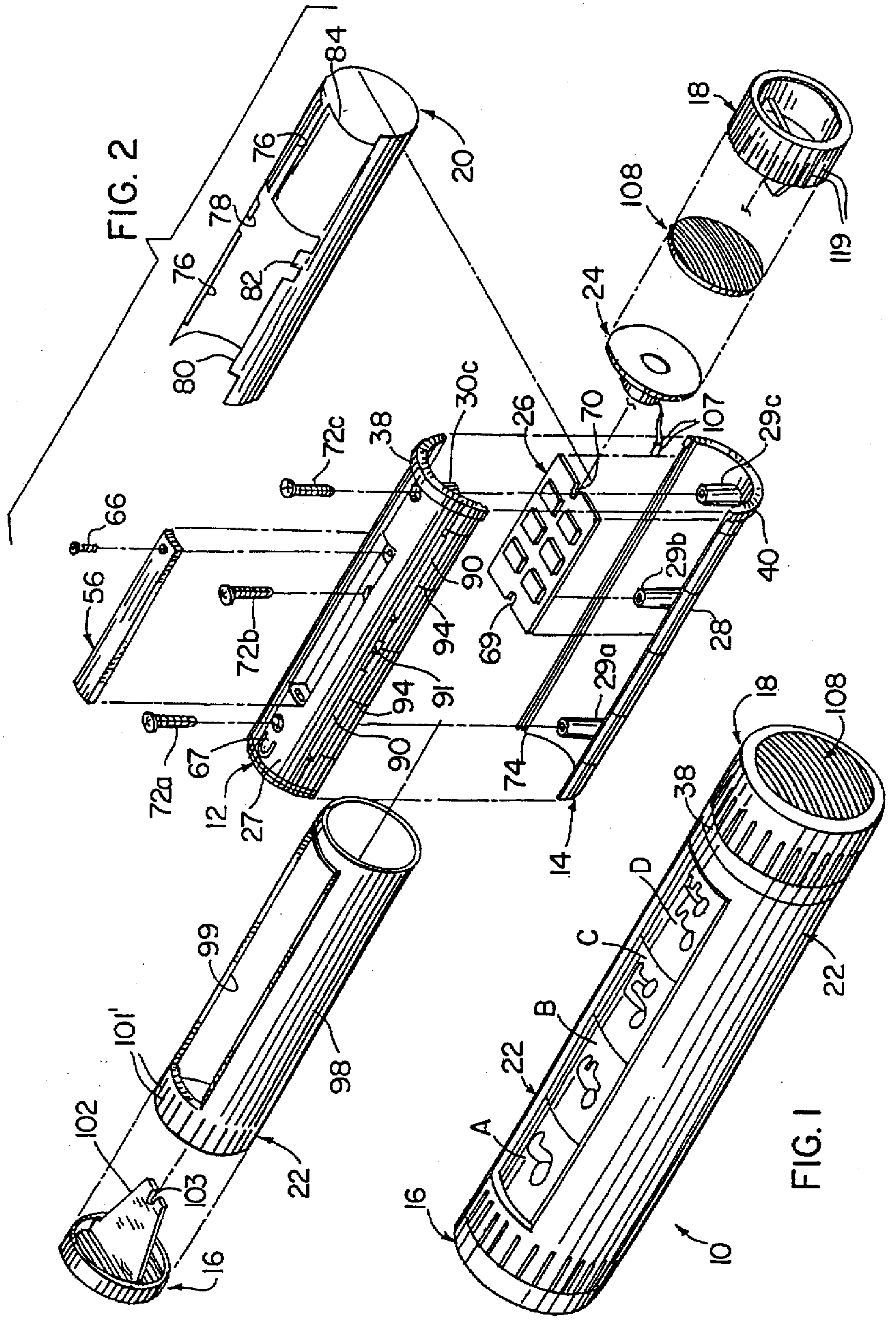
FIG. 1 is an isometric view of one embodiment of a sound generator constructed according to the invention.
FIG. 2 is an exploded isometric view of the sound generator of FIG. 1.

Referring to FIGS. 1 and 2, a sound generator 10 constructed according to the invention includes a housing constructed of a pair of housing sections 12, 14, a pair of end caps 16, 18, a keypad 20, a shield member 22, a speaker 24 and a sound generator printed circuit board 26.

Housing sections 12 and 14 are generally trough-shaped, and are preferably formed of any suitable thermoplastic material in an injection molding process. Sections 12, 14 define arcuate outer walls 27, 28, respectively, which are semicircular in cross-section, and an internal channel which likewise is semicircular in cross-section. Housing section 14 includes a series of bosses 29*a*, 29*b* and 29*c*, each of which includes an axial passage extending inwardly from its outer end. Likewise, housing section 12 includes a corresponding series of bosses 30*a*, 30*b* and 30*c*. As shown representatively with respect to boss 30*a*, each of bosses 30*a*–30*c* includes an axial passage 32 terminating in an end wall 34 defining an internal shoulder, and through which a passage 36 extends.

Housing sections 12, 14 are assembled together as shown in FIGS. 3 and 4 to define a tubular housing assembly in which the channels defined by housing sections 12, 14 cooperate to form an axial internal passage 38 extending between open ends defined by the housing assembly, and in which external semicircular outer walls 27, 28 of housing sections 12, 14 cooperate to define a circular outer housing wall.

At one end, housing sections 12, 14 are provided with semicircular shoulders 38, 40, respectively. When housing sections 12 and 14 are assembled together, shoulders 38, 40 cooperate to define a ring at the end of the housing assembly having oppositely facing abutment surfaces.

Referring to FIGS. 2–4, a battery compartment 42 is formed in housing section 12, and is defined by a bottom wall 44, end walls 46, 48 and side walls 50, 52. Boss 30*b* extends inwardly from bottom wall 44, and a boss 54 extends outwardly from bottom wall 44. Boss 54 includes a passage 56 extending inwardly from its outer end.

A door member 56 is adapted to be secured over battery compartment 42. Door member 56 includes a tab 58 at one end receivable within a slot 60 formed in end wall 46, and includes a boss 62 toward its opposite end engageable with the end of boss 54. Boss 62 includes a passage 64 which receives the head of a threaded fastener such as a screw 66, the shank of which extends through an opening formed in the end wall of boss 62 and into the passage in boss 54 for removably securing door member 56 over battery compartment 42. The outer wall of door member 56 is preferably arcuate and corresponds to the curvature of outer wall 27 of housing section 12. With this construction, battery compartment 42 occupies a portion of internal passage 38 extending between the open ends of the housing assembly formed when housing sections 12 and 14 are assembled together.

As shown in FIGS. 1 and 3, a tab 67 is formed in housing wall 27 by a U-shaped slot adjacent the end of housing section 12 opposite shoulder 38. A protrusion 68 is formed on tab 67 toward its free end.

Referring to FIGS. 2 and 3, a manually operable control system, consisting of keypad 20 and sound generator board 26, is secured to the housing defined by assembled housing sections 12 and 14. Board 26 includes slots 69, 70 extending toward each other from its end edges, which are arranged such that slot 69 is located between the ends of bosses 29*b* and 30*b*, and such that slot 70 is located between bosses 29*c* and 30*c*, when housing sections 12 and 14 are moved together toward their assembled condition. Threaded fasteners, such as screws 72*b* and 72*c*, extend between bosses 29*b*, 30*b* and 29*c* and 30*c*, respectively, to sandwich the end portions of board 26 between the ends of bosses 29*b*, 30*b* and 29*c*, 30*c* in order to securely mount board 26 within internal passage 38. the heads of screws 72*b*, 72*c* are received within the passage, such as 32, formed by bosses 30*b*, 30*c*, with the screw shanks extending through the end wall openings, such as 36, and into the passages associated with bosses 29*b*, 29*c*, respectively.

The side edges of board 26 are received within recesses 74 (FIG. 4) formed in the internal surface of housing side wall 28 defining passage 38. Recesses 74 are formed by a gap defined by mating structure forming the side edges of housing sections 12, 14 and including inner tab members 75 which engage board 26 adjacent its side edges for securing the board side edges within recesses 74. In combination with screws 72*b*, 72*c* clamping the ends of board 26, this functions to securely mount board 26 between housing sections 12, 14, and orients board 26 such that the plane of board 26 is parallel to the longitudinal axis of internal passage 38.

Figure 6:
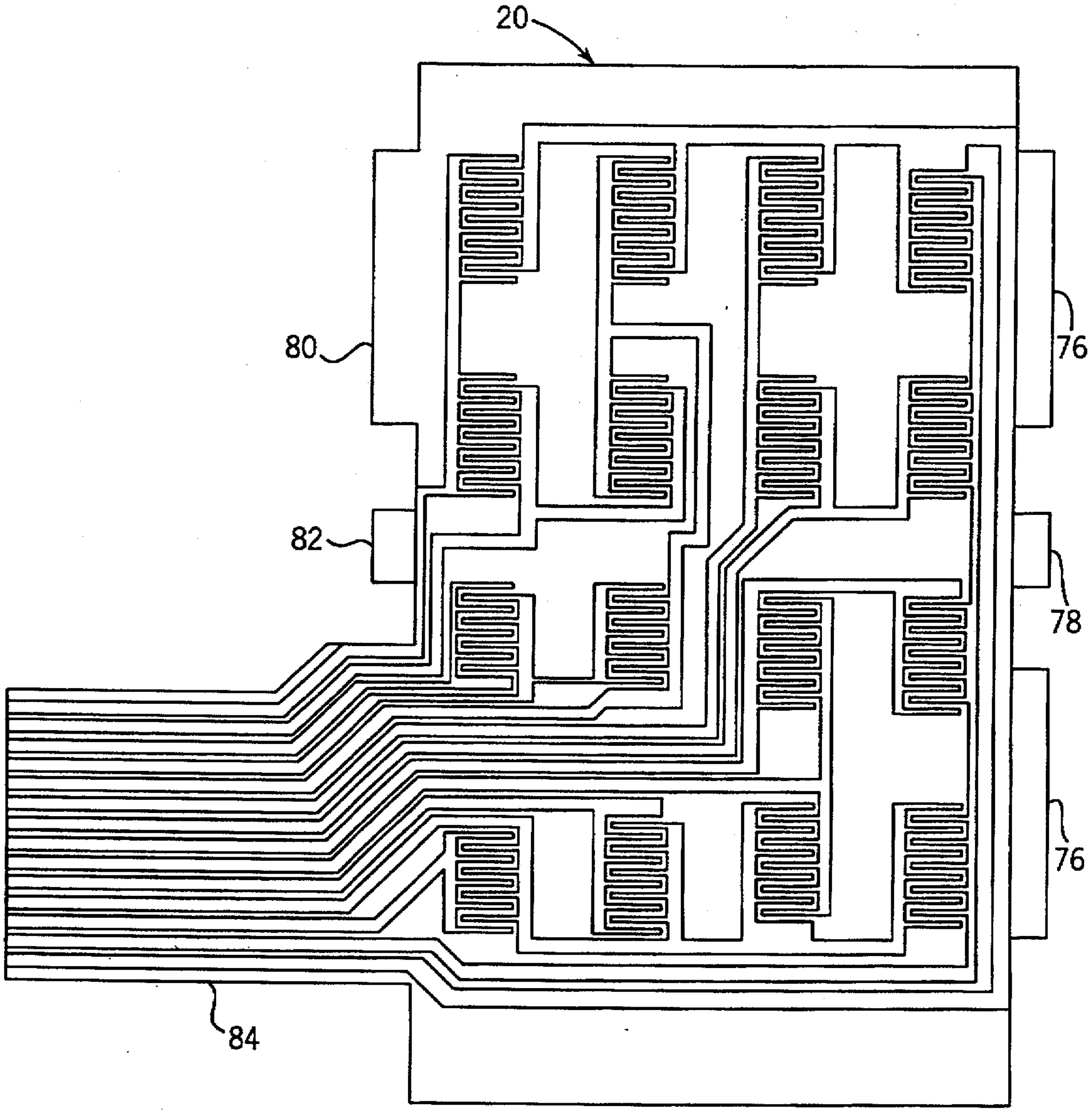
FIG. 6 is a plan view showing the conductive side of a printed keypad forming a part of the sound generator of FIG. 1.

As shown in FIG. 1, keypad 20 is in the form of a curled partially tubular printed mylar keypad having its conductive side facing downwardly. The layout of the conduct side of keypad 20 is generally as shown in FIG. 6. Keypad 20 has a pair of long end tabs 76 and a short central tab 78 at one of its ends, a long tab 80 and a short central tab 82 at its opposite end, and a tail section 84 extending from the same end as tabs 80 and 82. Tabs 76 are received within slots such as 86 (FIG. 4) extending inwardly from outer wall 27 of housing section 12, and tab 78 is received within a similarly formed central slot located between slots 86. Similar slots, such as shown at 90 and 91 in FIG. 1, are provided in the opposite side of housing section 12 for receiving tabs 80 and 82. Tail section 84 extends through the slot 90 adjacent shoulder 38, and is secured to a keypad connector 92 mounted to control board 26 for providing electrical inputs to control board 26.

The curved wall of keypad 20 is divided into separate switch sections, and a graphic label is applied to the non-conductive side of keypad 20. The label is divided into sections corresponding to the switch sections of keypad 20, and each label section is pre-printed with a graphic depiction or icon, such as shown in FIG. 1 at A, B, C and D. Representatively, the switch sections may be arranged in four rows of four separate switch elements.

As shown in FIGS. 1 and 3, other walls 27, 28 of housing sections 12, 14, respectively, include arcuate transverse ridges, such as shown at 94, as well as intersecting axial ridges 96 (FIG. 4), which underlie keypad 20. Ridges 94, 96 cooperate to divide housing outer walls 27, 28 into discrete sections or switch areas, and keypad 20 is mounted to the assembled housing such that each keypad switch section overlies one of the housing switch areas. In a conventional manner, a conductive element is secured to each housing switch area below each switch section defined by keypad 20. The curled configuration of keypad 20 provides a natural spring, allowing positive separation of keypad 20 from the conductive surfaces on housing sections 12 and 14 underlying each switch section or key, to avoid inadvertent key contact or shorting.

As can be appreciated, keypad 20 encompasses a majority of the surface area of the housing, with its ends terminating adjacent battery compartment 42 and with its sides being arranged such that one side is disposed adjacent shoulders 38, 40 and the other side is substantially coextensive with the opposite ends of housing sections 12 and 14.

Shield member 22 is preferably formed of a transparent plastic material, and is in the form of an open-ended axially extending tubular sleeve having a wall 98 defining an internal passage. A slot-like opening 99 is formed in wall 98. With keypad 20 secured to the housing as described above, shield member 22 is slid over the housing and keypad 20 such that one of its ends abuts one of the abutment surfaces defined by the ring formed by shoulders 38 and 40, with the other end of shield member 22 being substantially coextensive with the opposite ends of housing sections 12 and 14. Circumferential ridges 100 are provided on housing sections 12, 14, and engage shield sleeve 22 adjacent its ends. In this manner, shield sleeve 22 is rotatably mounted to the housing, and is rotationally supported at its ends by ridges 100 above keypad 20.

The inner surface of shield member wall 98 includes a series of small channels, such as shown at 101 (FIG. 3) adjacent one end of shield sleeve 22. A rib, such as 101', protrudes from the outer surface of wall 98 over each channel 101. Protrusion 68 on housing wall tab 67 is received within one of channels 101, serving as a releasable detent to fix the rotational position of shield sleeve 22 relative to the housing. When shield sleeve 22 is rotated on the housing, tab 67 deflects inwardly to release engagement of protrusion 68 within channel 101, and provides a clicking sound as channels 101 pass by protrusion 68.

End cap 16, which includes a tab 102 (FIGS. 1, 3) having a slot 103, is then secured to the housing by placing tab 102 between the ends of bosses 29*a* and 30*a*. Screw 72*a*, which extends through slot 103, is then tightened down so as to frictionally clamp tab 102 between the ends of bosses 29*a* and 30*a*.

End cap 16 further includes a peripheral side wall 104 having an end which engages the end of shield member 22, so as to prevent longitudinal movement of shield member 22 on the housing. End cap 16 also includes a grille-like end wall having a series of slots 106 which establish communication between internal passage 38 and the exterior of the housing.

Speaker 24 is a conventional sealed mylar acoustic speaker, and representatively may have a size of 29 mm and a resistance of 32 ohms. Referring to FIGS. 1 and 3, speaker 24 includes leads 107 secured to board 26, and is mounted to a grill insert 108 in any satisfactory manner such as by sonic welding or by use of a bonding agent or adhesive. Insert 108 is then secured in a similar fashion to end cap 18. Grill insert 108 includes a series of slots 110 which establish communication between speaker 24 and the exterior of the housing when end cap 18 is mounted to the housing.

End cap 18 includes a tab 112 having a slot 114, which receives the threaded shank of screw 72*c* when tab 112 is positioned as shown in FIG. 3 between the end of boss 30*c* and the underside of control board 26. When screw 72*c* is tightened down, tab 112 and the end of board 26 are sandwiched between the ends of bosses 29*c*, 30*c* to assemble board 26, end cap 18 and housing sections 12, 14 together.

End cap 18 further includes a side wall 116, the end of which abuts the outwardly facing abutment surface defined by the ring formed by shoulders 38 and 40. Side wall 116 defines an internal cavity 118, which establishes communication between the back side of speaker 24 and housing internal passage 38. The outer surface of side wall 116 includes a series of gripping ribs 119.

When assembled, sound generator 10 has an overall length of approximately 7 inches and a diameter of approximately 1.5 inches.

Figure 7:
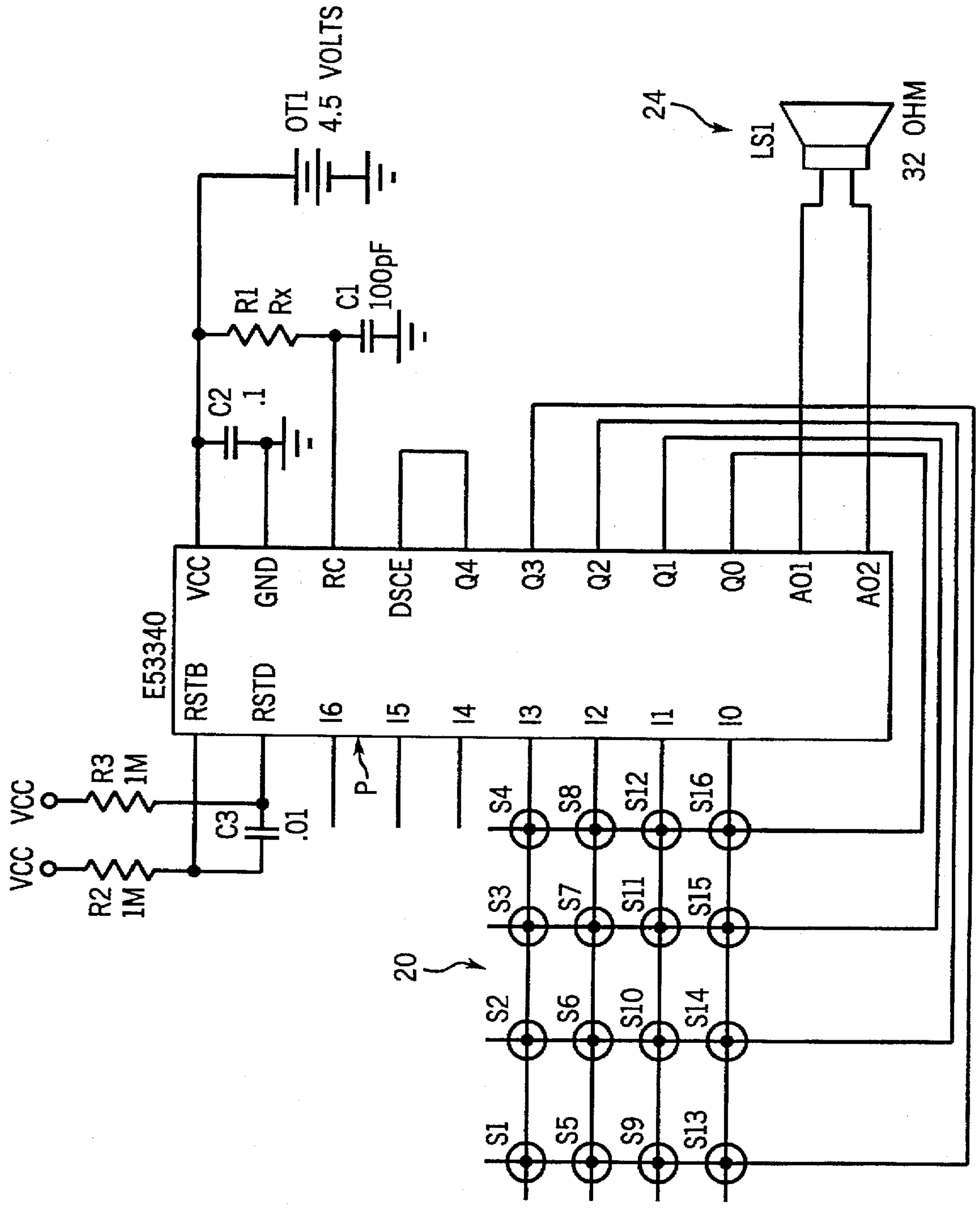
FIG. 7 is an electronic schematic diagram for the sound generator of FIG. 1.

FIG. 7 illustrates the electronic components mounted to circuit board 26. As shown, a processor P, which representatively may be a model ES3340 processor such as is available from ESS Technology, Inc. of Fremont, Calif., forms the centerpiece of the electronic circuitry, and is connected in a conventional manner with keypad 20, speaker 24 and appropriate resistors and capacitors.

In operation, sound generator 10 functions as follows. After assembly as described above, shield sleeve 22 is rotatable relative to the housing such that opening 99 formed in shield sleeve side wall 98 can be moved into alignment with any desired row of switch sections or keys defined by keypad 20, as shown in FIG. 1. The detent structure of tab 67, protrusion 68 and channels 101 releasably secures shield sleeve 22 in a predetermined rotational position relative to the housing such that slot 99 is aligned over a row of switches, such as switches A–D. The operator can then depress any one of the switches, which establishes electrical contact between the conductive material on the housing. This closing of the contacts energizes control board 26 to actuate a sound effect capsule corresponding to the depiction or graphic illustrated on the switch being depressed. When the user releases manual engagement with the switch, the contact is broken and generation of the sound effect cancel is stopped. Subsequent closure of the same or another switch section or key results in generation of a subsequent sound effect capsule.

The electronic signals from control board 26 are transferred through leads 107 to speaker 24, and speaker 24 functions in a conventional manner to emit sound waves as dictated by such signals. From the front side of speaker 24, such sound waves are transmitted through slots 110 in grill insert 108 to the exterior of sound generator 10. Sound waves emanating from the back side of speaker 24 travel through housing internal passage 38, and are emitted therefrom through slots 106 in end cap 16. The length of internal passage 38 is selected so as to ensure that, when sound waves are emitted from end cap slots 106, such waves do not cancel sound waves being emitted from grill insert 108 at the opposite end of the housing. This construction provides a highly efficient sound generating system utilizing only a single speaker by resonating the sound waves from the back side of the speaker through an internal resonating chamber defined by internal passage 38 and then emitting such sound waves from the opposite end of the housing.

As can be appreciated, shield member opening 99 provides access to battery compartment door member 56 when shield member 22 is rotated to the back of the housing, and also provides access to assembly screw 72*a*.

It should be understood that the specific aspects of the above description and the drawings are applicable to the currently-envisioned best mode of carrying out the invention. Certain aspects of construction, assembly and operation may vary from the illustrated and described aspects without departing from the basic invention concept. Some such aspects include the arrangement of the keys or switches, the assembly of the housing, the construction and assembly of acoustically transmissive members (such as the grill members) to the housing, mounting of the circuit board, and the construction of the switches or keys and their mounting to the housing.

FIGS. 9–12 illustrate an alternate embodiment of the invention, and like reference characters will be used where possible to facilitate clarity. In this embodiment, a sound generator 130 includes a housing 132 formed of a pair of housing sections, and disposed between end caps 16 and 18.

Figure 8:
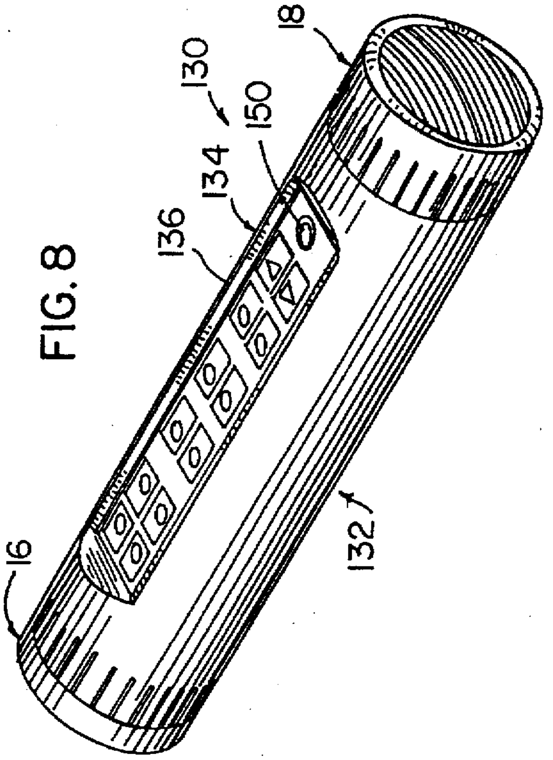
FIG. 8 is a view similar to FIG. 1, showing another embodiment of the sound generator of the invention.
Figure 9:
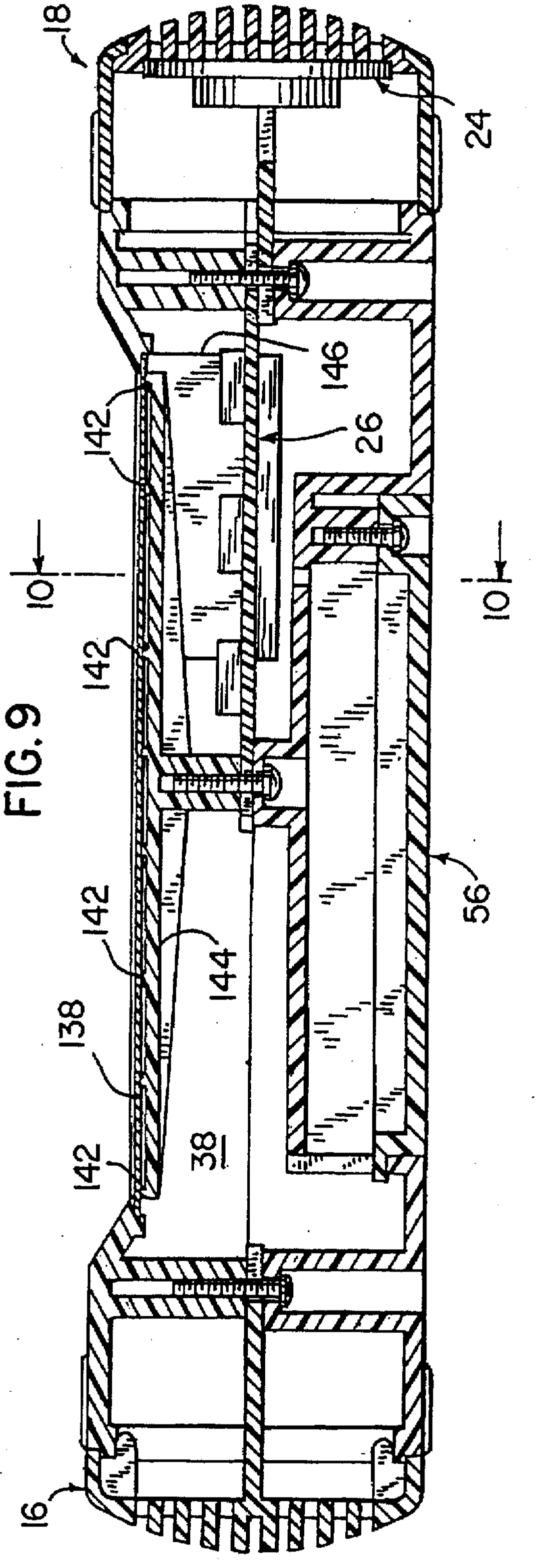
FIG. 9 is a view similar to FIG. 3, showing a longitudinal section of the sound generator of FIG. 8.
Figure 10:
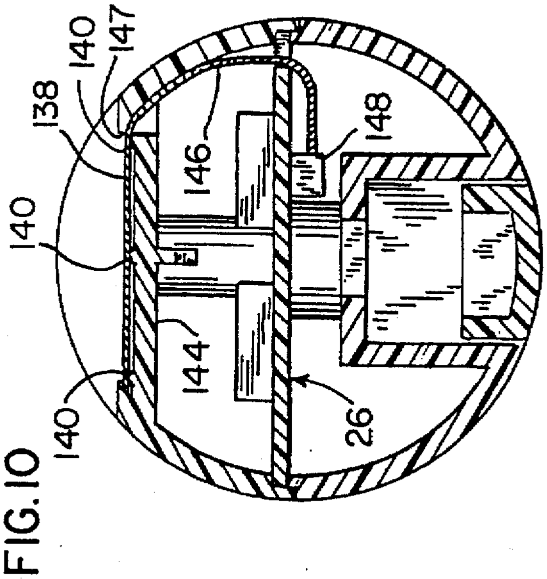
FIG. 10 is a section view taken along line 10—10 of FIG. 9.

Housing 132 is constructed of a pair of housing sections similar to sections 12 and 14, but does not include a shield member such as 22. In this embodiment, one of the housing sections, preferably the section which does not contain battery compartment 42, is provided with a control portion 134 defining an opening 136 within which a printed mylar keypad 138 is located. Keypad 138 is constructed similarly to keypad 20 with electrical contacts on its underside defining separate switch elements or keys. The switches defined by mylar keypad 138 overlie a series of switch areas defined by a series of longitudinal ridges 140 (FIG. 8) and a series of transverse ridges 142 (FIG. 7), with an electrically conductive element being secured within each switch area. Ridges 140, 142 are formed integrally with a flat wall section 144 forming a part of one of the housing sections below opening 136. Mylar keypad 138 includes a tail section 146 which extends through a slot 147 between the edge of opening 136, which is interconnected with circuit board 26 via a keypad connector 148.

Alternatively, it is understood that any other type of switching arrangement could be employed in place of the membrane-type keypad shown and described, e.g. a direct push button key matrix mounted to housing control portion 34 having outwardly extending buttons or keys.

Sound generator 130 may utilize any type of sound generation. In a particularly preferred form, however, sound generator 130 generates drum sounds, with each switch panel area representing a certain type of drum beat.

Figure 11:
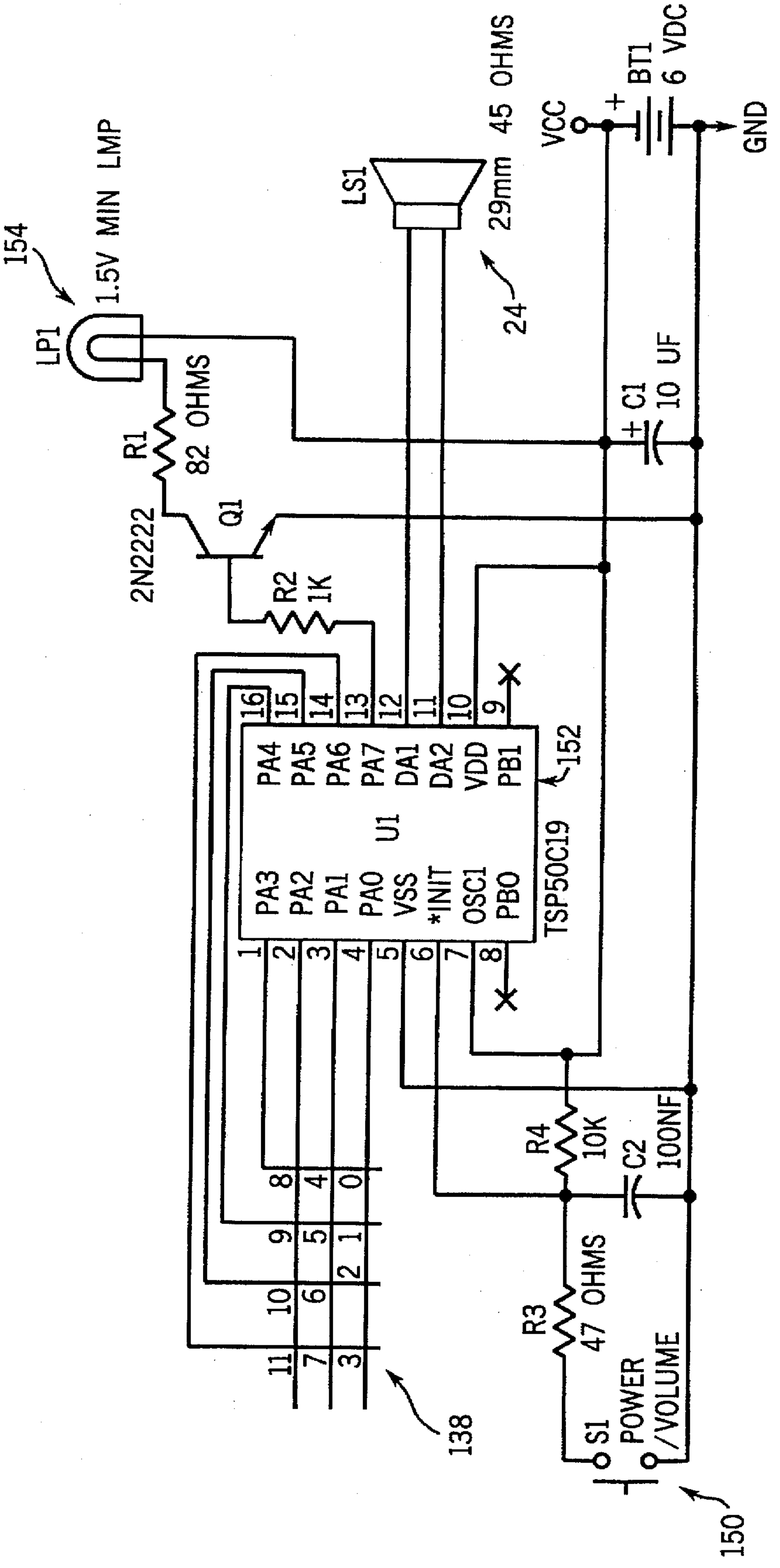
FIG. 11 is an electronic schematic diagram for the sound generator of FIG. 8.

FIG. 11 shows an electronic schematic diagram for the components mounted to circuit board 26 for sound generator 130. A power/volume switch 150 is interconnected through appropriate resistors and capacitors with the battery power source and with a processor 152, which representatively may be that such as is available from Texas Instruments under its designation 50C19, or other equivalent sound synthesis microprocessor. The electronic circuitry further includes a lamp 154 which switches between its on state and its off state in response to the beat of the drum sound generated by processor 152. The sound output of processor 152 is interconnected in a conventional manner with speaker 24. Keypad 138 is connected in a conventional manner with the inputs to processor 152.

Figure 12:
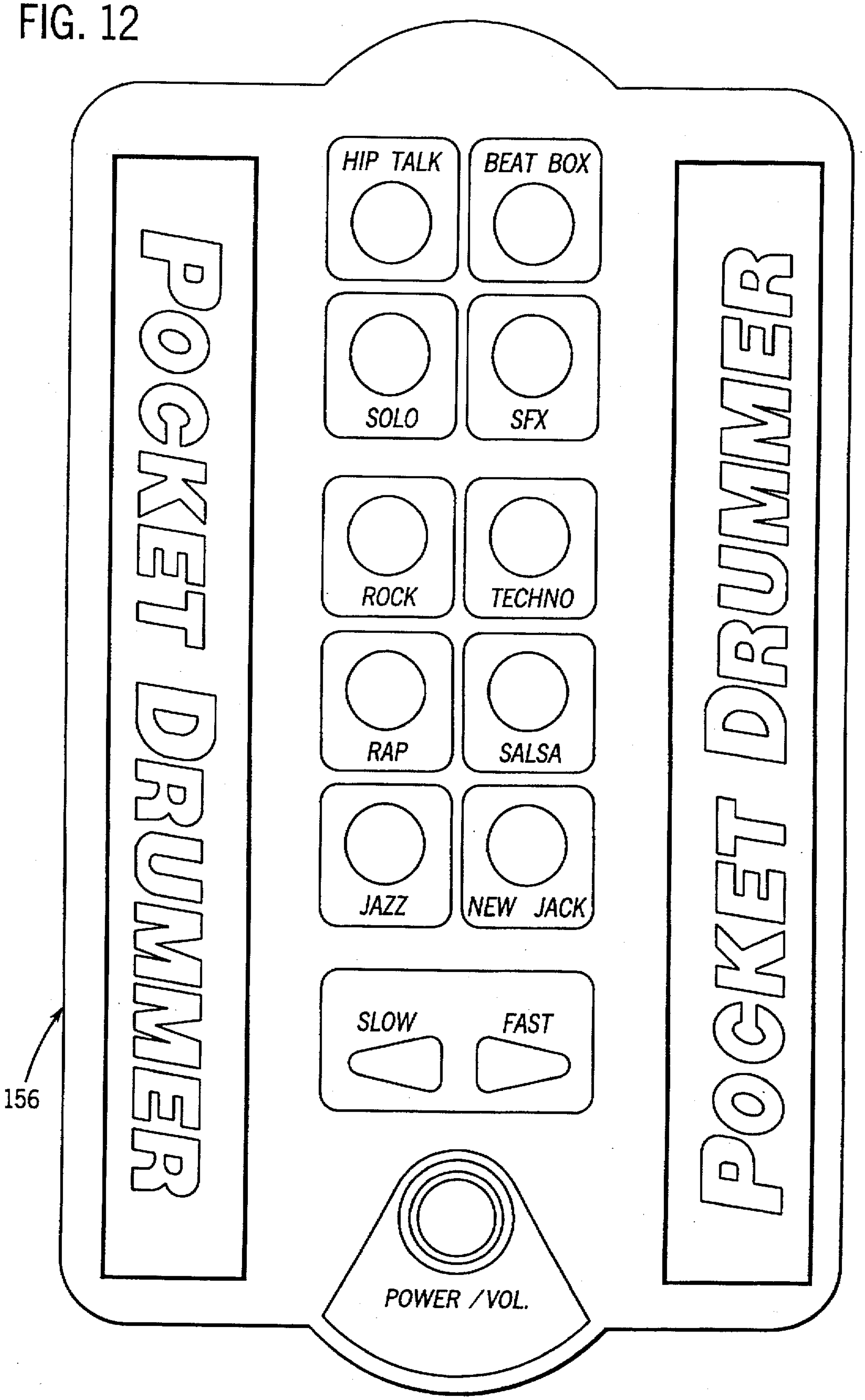
FIG. 12 is a view of a graphic label for the sound generator of FIG. 8.

FIG. 12 depicts a representative label overlay 156 for use with sound generator 130. Label 156 includes a power/volume area which overlays switch 150, as well as slow/fast arrows which overlay the switch areas which function to speed up or slow down the beat of the generated drum sound. The central portion of label 156 designates the various drum beats which can be generated using sound generator 130. The upper portion of label 156 overlays the portion of keypad 138 in which various additional drum sounds can be generated over the underlying drum beat. The various keys of keypad 138 provide the following functions:

Power/Volume Key: Initially depressing this key will trigger the unit and initiate a randomly selected rhythm pattern at full volume. A second depression of this key will reduce the volume to a mid level. The third depression of this key will shut off the unit. (After a predetermined period of time, such as 30 seconds, if no key is depressed the unit will automatically shut off.)

Rhythm Selector Keys: Once the unit is activated, depressing any of the six Rhythm Selector Keys will automatically switch the rhythm pattern to any rhythm selected (currently defined as: Rock, New Jack, Rap, Techno, Jazz and Salsa)

Solo Key: Depressing this key at any time while any rhythm is in progress will introduce an exciting variety of solo performances based on a wide range of specific percussion instruments. The solos will integrate with the rhythm and not interrupt or "break" the tempo of the rhythm.

Hip Talk Key: Similar to the solo key, this key will introduce a random variety of funny and hip speech synthesized phrases integrated with the rhythm pattern selected (i.e., "That's Fresh Man", "Funky, Funky", etc.).

SFX (Sound Effects) Key: Also similar to the solo key, this key will introduce an exciting variety of funky electronic sound effects.

Beat Box Key: Depressing this key at any time, will introduce a wide variety of vocal rhythm sounds complimenting and tailored to each specific rhythm pattern. As with the solo key these vocal fills will integrate with and not "break" the tempo of the rhythm.

Tempo Keys: Two complimentary "arrow" keys (slow/fast), will graduate the tempo rate of any running rhythm pattern in increments as they are depressed. The unit will initialize when first turned on, at a mid tempo point. While in operation a signal tone will momentarily indicate when the mid point is reached. In addition, a small internal lamp illuminating one end of the tube will flash in synchronization with the tempo of the rhythm.

Various alternatives and embodiments are contemplated as being within the scope of the following claims particularly pointing out and distinctly claiming the subject matter regarded as the invention.

We claim:

1. A sound generating device, comprising:

a body defining a first end, a second end, and an exterior, wherein the body includes a first acoustically open portion and a second acoustically open portion, wherein the first and second acoustically open portions are spaced from each other and open onto the exterior of the body, and wherein the body defines an acoustically open internal passage extending between the first and second acoustically open portions;

a speaker positioned between the first and second acoustically open portions, wherein sounds emitted by the speaker are communicated exteriorly of the body through the first and second acoustically open portions;

a sound signal generator interconnected with the speaker; and a manually operable control arrangement interconnected with the sound signal generator and including manually operable actuator means accessible from the exterior of the body.

2. The sound generating device of claim 1, wherein the body comprises a hollow tubular housing and wherein the internal passage extends axially between the first and second acoustically open portions.

3. The sound generating device of claim 2, wherein the housing defines first and second ends and wherein the first and second acoustically open portions are located at the first and second ends, respectively, of the housing, and further comprising a grill member positioned within each of the first and second ends, wherein each grill member defines a series of openings establishing communication between the internal passage and the exterior of the housing.

4. The sound generating device of claim 3, wherein the speaker is located adjacent one of the housing ends, and wherein the housing ends are spaced from each other a distance so as to prevent sounds emanating from the housing ends from canceling each other.

5. The sound generating device of claim 3, wherein the speaker is mounted to a grill member secured to the body adjacent one of its ends, the grill member defining a series of openings establishing acoustical communication between the speaker and the exterior of the housing.

6. The sound generating device of claim 3, wherein each grill member includes a mounting tab extending into the internal passage, and further comprising a pair of engagement bosses associated with the housing and with which the mounting tab is engaged for securing the grill member to the housing.

7. The sound generating device of claim 2, further comprising a battery chamber having a removable door member for providing access to the battery chamber from the exterior of the housing.

8. The sound generating device of claim 1, wherein the manually operable actuator means comprises a series of manually operable switches mounted to the body.

9. The sound generating device of claim 1, wherein the control arrangement includes a circuit board to which the speaker is connected, wherein the circuit board is disposed within the internal passage.

10. The sound generating device of claim 9, wherein the passage extends along a longitudinal axis, and wherein the circuit board is arranged such that it extends substantially parallel to the longitudinal axis of the passage.

11. The sound generating device of claim 10, wherein the body is defined at least in part by a housing formed of a pair of halves interconnected together by a pair of bosses through which fasteners extend, and wherein the circuit board is sandwiched between the pair of bosses and secured in position by the fasteners.

12. A sound generating device, comprising:

a hollow tubular housing having a substantially circular side wall and defining opposite first and second acoustically open ends and an axial internal passage extending therebetween, the body having an exterior;

a speaker positioned between the first and second ends;

a sound signal generator interconnected with the speaker;

a manually operable control arrangement interconnected with the sound signal generator and including manually operable actuator means accessible from the exterior of the body, wherein the manually operable actuator means comprises at least two radially offset switches located adjacent the side wall; and a shield member rotatably mounted to the housing and having an opening for providing access to certain of the switches dependent upon the rotational position of the shield member relative to the housing.

13. The sound generating device of claim 12, wherein the switches are arranged in radially offset rows, and wherein the opening in the shield member is sized and shaped so as to provide access to one row of switches.

14. A sound generating device, comprising:

a body defining opposite first and second acoustically open ends and an internal passage extending therebetween, the body having an exterior;

a speaker positioned between the first and second ends;

a sound signal generator interconnected with the speaker; and a manually operable control arrangement interconnected with the sound signal generator and including manually operable actuator means accessible from the exterior of the body, wherein the manually operable actuator means comprises at least two switches interconnected with an arcuate wall defined by the body, and further comprising a shield member movably mounted to the body over the arcuate wall, the shield member having an opening therein providing access to certain of the switches dependent upon the position of the shield member relative to the body.

15. The sound generating device of claim 14, wherein the body comprises an elongated, tubular housing having an arcuate outer wall, and wherein the shield member comprises a circular elongated sleeve through which the housing extends.

16. The sound generating device of claim 15, further comprising an end cap member having a series of openings therein establishing acoustical communication between the internal passage and the exterior of the housing and mounted to an end of the housing, and wherein the end cap member functions to engage an end of the sleeve to retain the sleeve in position on the housing.

17. A sound generating device, comprising:

a housing defining first and second ends and a control portion having an outer surface;

at least one speaker mounted to the housing;

a control arrangement interconnected with a sound signal generator and the speaker and mounted to the housing and including at least two offset manually actuable switches; and a shield member mounted to the control portion of the housing and having at least one opening, the shield member being movable relative to the control portion of the housing for selectively aligning at least one of the switches with the opening for providing manual access thereto.

18. The sound generating device of claim 17, wherein the housing comprises a tubular member defining an internal cavity within which the speaker is located, wherein the outer surface of the control portion of the housing is circular in cross-section, and wherein the shield member comprises a tubular sleeve encircling the control portion of the housing.

19. The sound generating device of claim 18, wherein the manually actuable switches are arranged in radially offset rows, and wherein the shield member opening is sized and shaped so as to provide manual access to a row of switches.

* * * * *